April 29, 1941.   J. C. BUCHANAN   2,240,110
REFRIGERATING APPARATUS
Original Filed Oct. 30, 1936   5 Sheets-Sheet 1
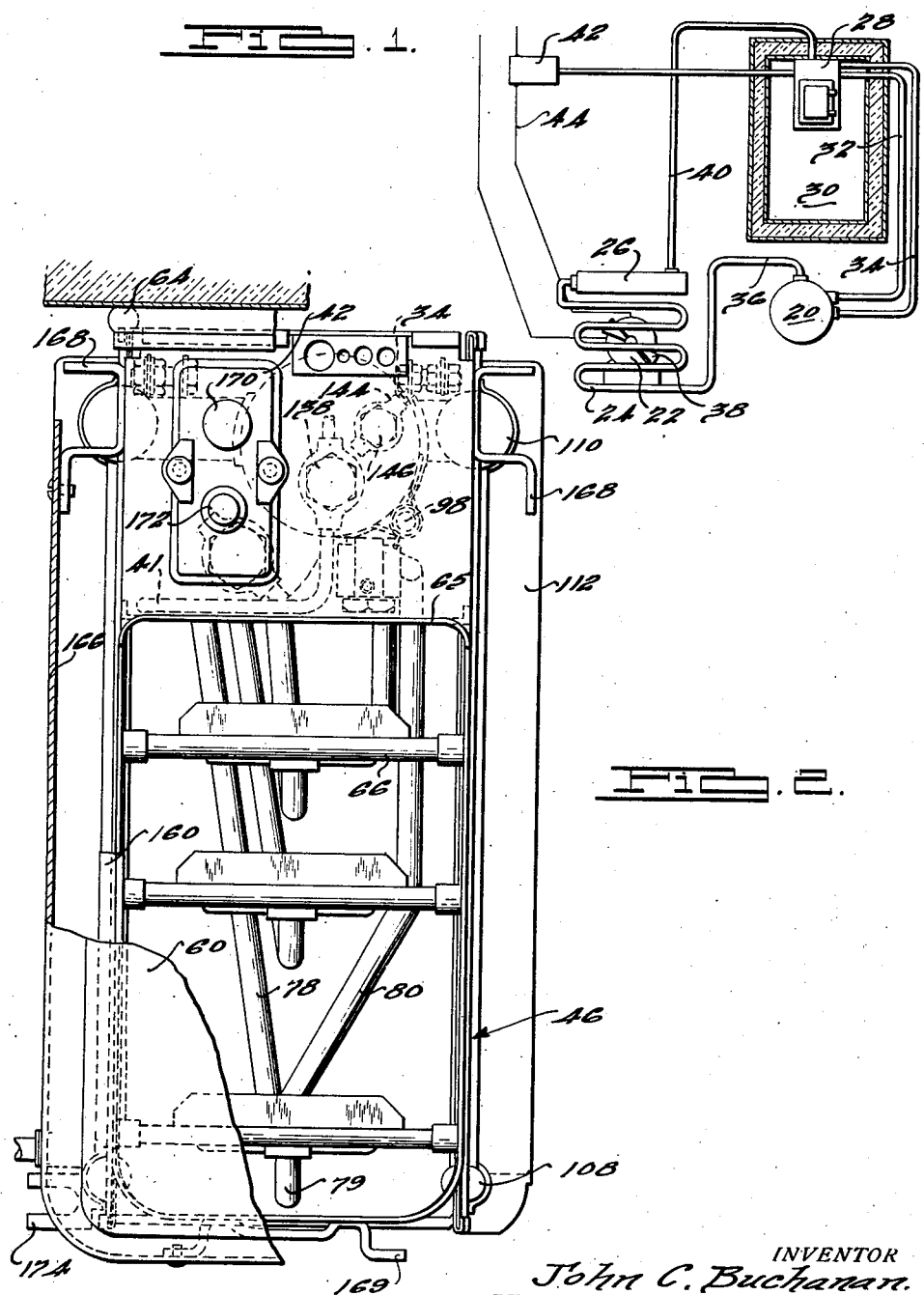
INVENTOR
John C. Buchanan.
BY
ATTORNEY

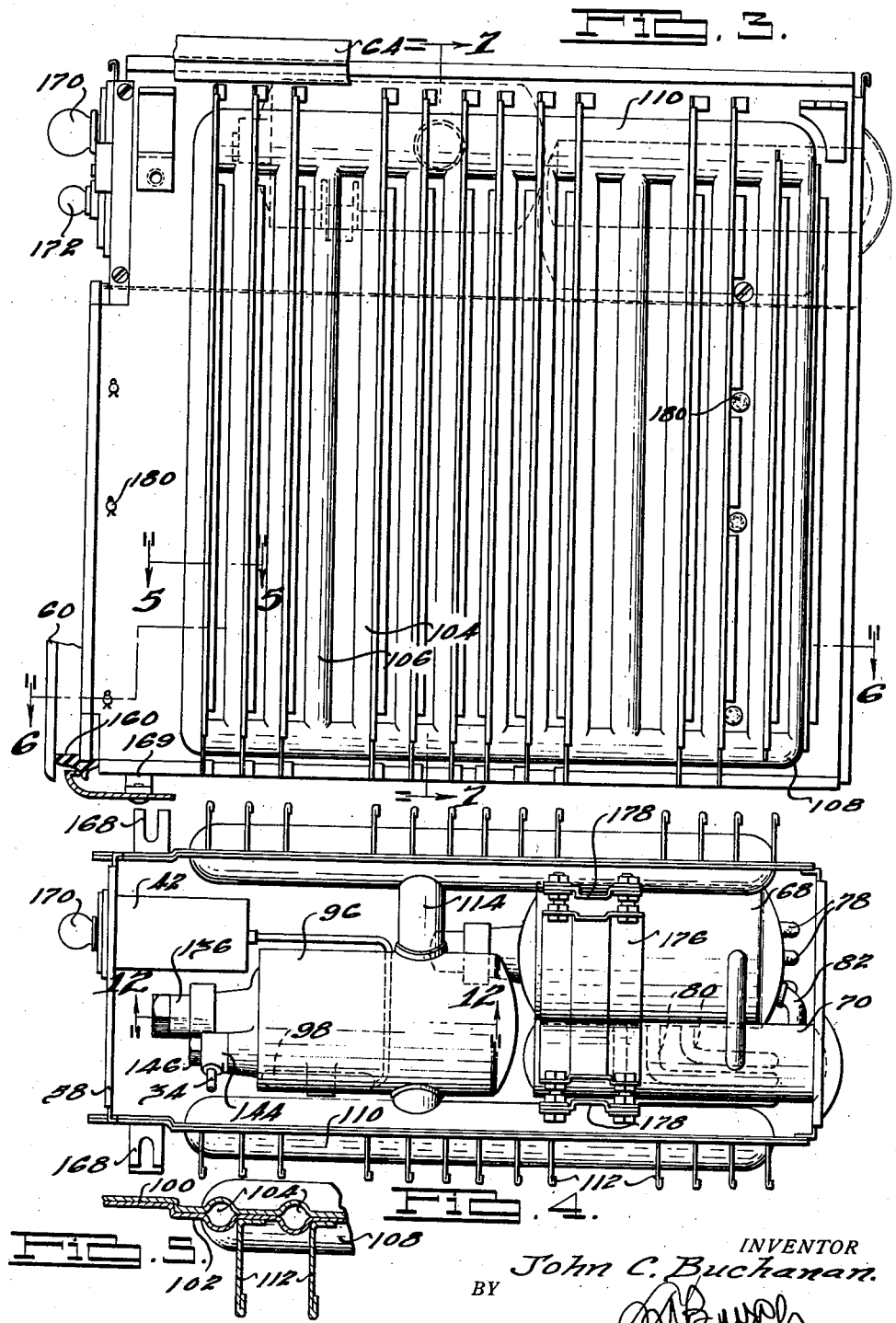

April 29, 1941. J. C. BUCHANAN 2,240,110
REFRIGERATING APPARATUS
Original Filed Oct. 30, 1936 5 Sheets-Sheet 3
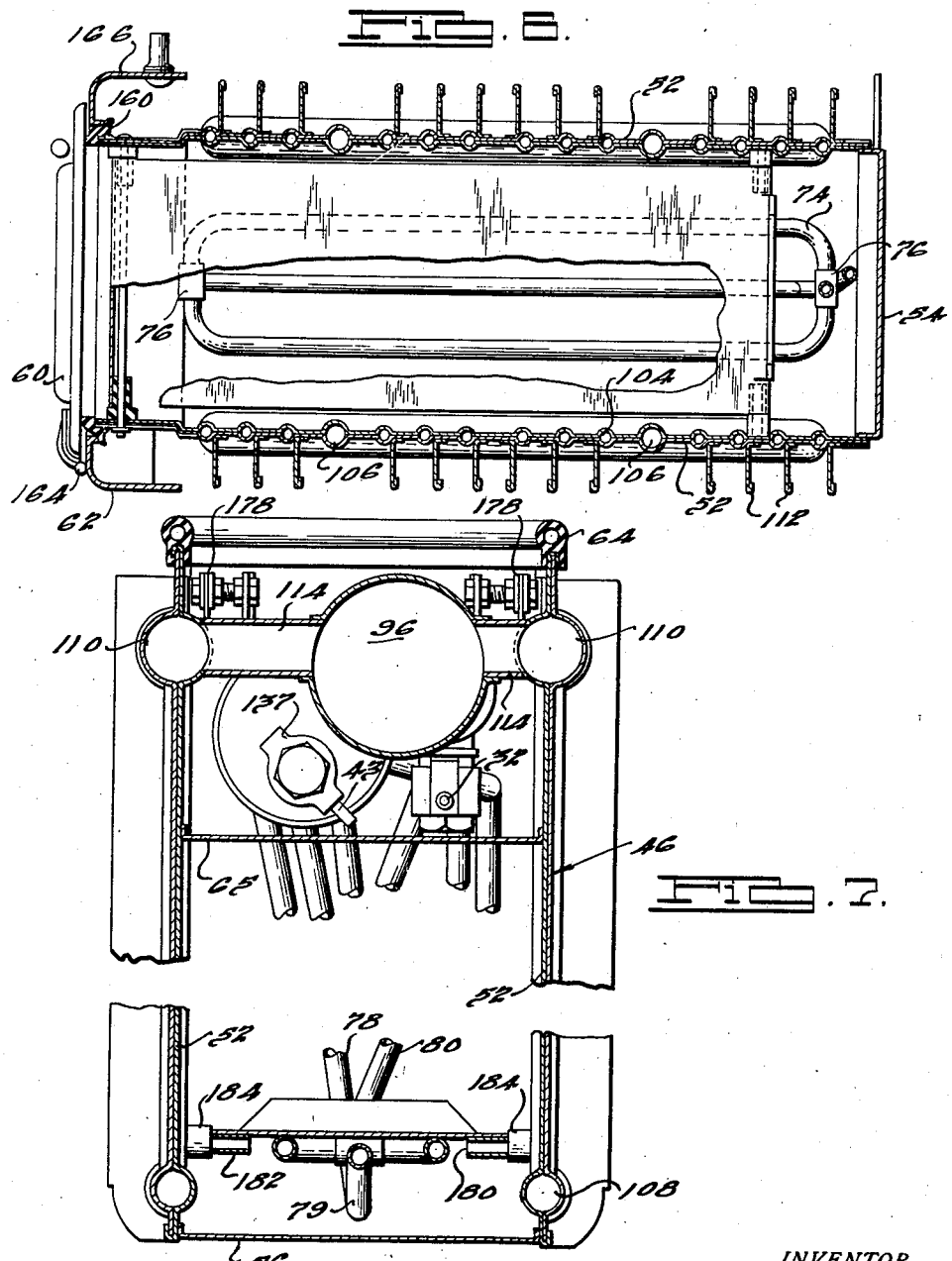
INVENTOR
John C. Buchanan
BY
ATTORNEY April 29, 1941.  J. C. BUCHANAN  2,240,110
REFRIGERATING APPARATUS
Original Filed Oct. 30, 1936  5 Sheets-Sheet 4
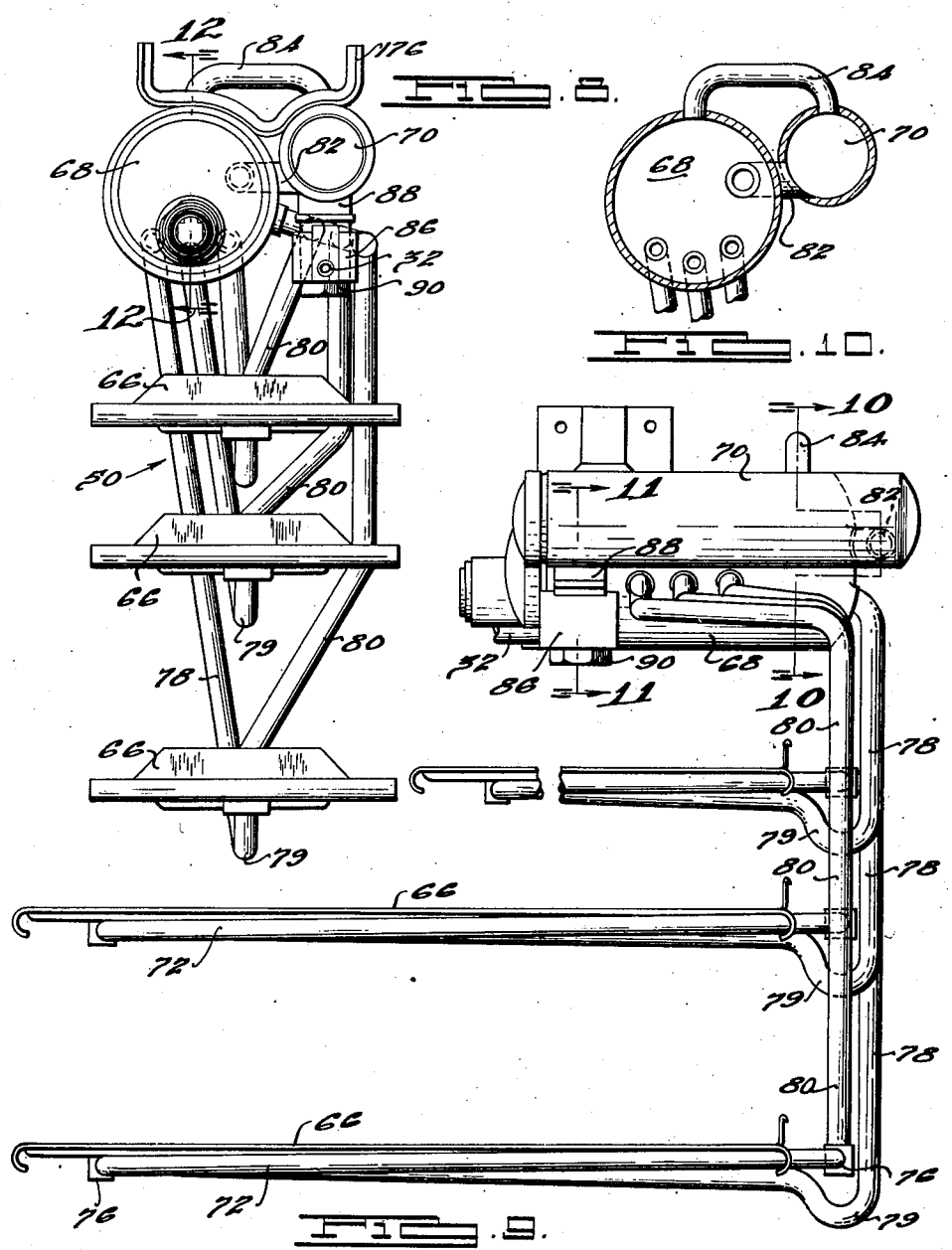
INVENTOR
John C. Buchanan.
BY
ATTORNEY April 29, 1941.　　　J. C. BUCHANAN　　　2,240,110
REFRIGERATING APPARATUS
Original Filed Oct. 30, 1936　　5 Sheets-Sheet 5

INVENTOR
John C. Buchanan.
BY
ATTORNEY

Patented Apr. 29, 1941

2,240,110

UNITED STATES PATENT OFFICE 2,240,110

REFRIGERATING APPARATUS

John C. Buchanan, Ypsilanti, Mich., assignor to Borg-Warner Corporation, a corporation of Illinois Original application October 30, 1936, Serial No. 108,444. Divided and this application December 19, 1938, Serial No. 246,533

8 Claims. (Cl. 62—126)

This application is a division of our application Ser. No. 108,444, filed October 30, 1936, for "Refrigerating apparatus."

This invention relates to refrigerating apparatus and has particular reference to improvements in refrigerating systems and improvements in elements or apparatus for use in such systems.

This invention has particular reference to a system or method of and apparatus for producing refrigeration at a plurality of different temperatures at the same time. In the embodiment of the invention selected for purposes of illustration, a refrigerating system including an evaporator having two sections is provided; the evaporator being disposed in a heat insulated compartment and being adapted for producing refrigeration at a relatively low temperature for fast freezing and storage of frozen foods, and at the same time to produce refrigeration at a somewhat higher temperature for the storage of foods in an unfrozen condition and in an atmosphere having a higher relative humidity than that obtained in the low temperature part of the evaporator.

In refrigerators of the household type now in use, wherein a refrigerating effect is obtained by the evaporation of a refrigerant within a container, such as an evaporator, or cooling coil, the temperature at which such evaporator or cooling coil is maintained is below the freezing point of water, as a result of which moisture is condensed out of the air within the heat insulated compartment and collects upon the surface of the evaporator or cooling coil, resulting in dehydrating the air within such heat insulated compartment. Foodstuffs placed within such heat insulated compartment are thus subjected to dehydration which causes shrinkage of such food and which dehydration tends to impair the quality and appearance of such food. The amount of dehydration that takes place under such conditions is influenced to a large extent by the temperature at which the cooling coil is maintained. In refrigerating equipment of the household type now in use, the temperature of the cooling coil or evaporator is maintained in the neighborhood of 15° F. in order to produce adequate refrigeration within the heat insulated compartment.

It is an object of the present invention to utilize in a heat insulated compartment an evaporator or cooling coil having two portions or sections, one of which sections is maintained at a temperature from 18° to 29° F. and is adapted for cooling the air within the heat insulated compartment, and the other of which sections is maintained at a temperature from 0° to 10° F. and separated from the air cooling portion of the evaporator and which low temperature section is adapted for fast freezing.

Another object of the invention is to provide a refrigerating system which is adapted for producing refrigeration within a heat insulated compartment without greatly reducing the relative humidity of the air within such compartment.

Another object of the invention is to provide in a single refrigerating system, a plurality of evaporators or cooling coils working at different suction pressures so as to obtain different temperature conditions in each section or part of the evaporator.

Another object of the invention is to provide in a heat insulated compartment an evaporator adapted to cooperate with a wall of such compartment for dividing the space within such compartment into two separate parts, the evaporator being designed so as to produce refrigeration in one of said parts at one temperature and so as to produce refrigeration in the other of said parts of said compartment at a different temperature.

Other objects and advantages of the invention will be apparent from a consideration of the following specification taken in conjunction with the accompanying drawings of which there are five (5) sheets and wherein:

Fig. 1 is a diagrammatic illustration of a refrigerating system embodying the invention;

Fig. 2 is a front elevational view of the evaporator arranged within the heat insulated compartment, some of the parts being broken away and other parts being illustrated in section;

Fig. 3 is a side elevational view of the evaporator, certain of the parts being illustrated in section;

Fig. 4 is a plan view of the evaporator;

Fig. 5 is a horizontal cross-sectional view of a part of the evaporator taken on the line 5—5 of Fig. 3 and showing the refrigerant ducts and illustrating the arrangement of the air cooling fins;

Fig. 6 is a horizontal cross-sectional view of the evaporator taken along the staggered line 6—6 of Fig. 3 looking in the direction of the arrows;

Fig. 7 is a vertical cross-sectional view of the evaporator taken in a plane on the line 7—7 of Fig. 3 looking in the direction of the arrows;

Fig. 8 is a front elevational view of the low temperature or freezing section of the evaporator;

Fig. 9 is a side elevational view of the low temperature or freezing section of the evaporator;

Fig. 10 is a vertical sectional view of the headers used in the low temperature section of the evaporator, and taken along the staggered line 10—10 of Fig. 9 looking in the direction of the arrows;

Figure 12:
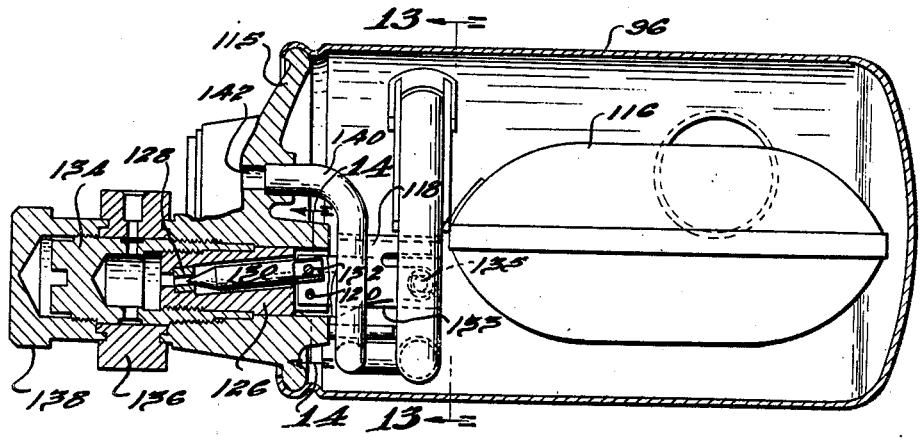
Fig. 12 is a vertical longitudinal section taken along the line 12—12 of Fig. 4 and illustrating the float valve and oil return of the high temperature section of the evaporator.

In Fig. 1 there is diagrammatically illustrated a refrigerating system of the compressor-condenser-expander type and including a compressor 20 adapted to be driven by an electric motor 22, a condenser 24, a liquid receiver 26 and an evaporator or cooling element 28 arranged within a heat insulated compartment 30. The evaporator comprises a pair of sections, one of which is connected by a suction line 32 to one part of the compressor 20, and the other of which sections of the evaporator is connected by a suction line 34 to another part of the compressor 20 so as to produce a different suction pressure in each section of the evaporator. A conduit 36 is adapted to convey compressed refrigerant from the compressor 20 to the condenser 24 where condensation of such refrigerant takes place, a fan 38 driven by the motor 22 being adapted for circulating air over the condenser coil. The condensed refrigerant is collected in the receiver 26 and is adapted to be independently supplied therefrom to each section of the evaporator 28 through a conduit 40 and under the control of some suitable regulating device, such as, a float controlled valve. A thermostatic element is thermally associated with the evaporator 28 and is adapted to operate a control 42 in the motor circuit 44 for the purpose of controlling the operation of the condensing part of the system so as to maintain certain temperature conditions within the evaporator 28 and the heat insulated compartment 30.

The heat insulated compartment 30 is adapted for the storage of provisions and is provided with an access opening and a closure therefor. The inner wall of the compartment 30 preferably is formed by an impervious lining such as metal.

The evaporator 28 comprises two sections, one of the sections being illustrated as comprising a shell indicated generally at 46 and the other of said sections being indicated generally at 50 and comprising a series of refrigerated plates or shelves as particularly illustrated in Figs. 8 and 9 and adapted for disposition within the shell 46.

The shell 46, referring more particularly to Figs. 6 and 7, comprises a pair of spaced and vertically arranged side walls 52 carrying refrigerant ducts, a back wall 54 closing the space between the side walls 52 at the back thereof, a bottom wall 56 closing the space between the side walls 52 at the bottom thereof, and a front wall 58 (Fig. 4) closing the space between the side walls 52 at the front and adjacent the upper portion thereof and providing therebelow an access opening to the space within the shell 46 which access opening is adapted to be closed by a closure 60 carried by a shield 62 secured to the front of the shell 46. The entire evaporator including the shell 46 preferably is disposed adjacent the top of the heat insulated compartment 30 and spaced from each of the side walls thereof, a resilient gasket 64 of compressible material preferably being arranged between the side, front and rear walls of the shell 46 and the adjacent surface of the top wall of the heat insulated compartment so as to seal the space within the shell 46 from the space exteriorly thereof and within the heat insulated compartment 30. The side, rear and bottom walls of the shell 46 are so constructed and connected as to form a compartment or space internally thereof to which access may be had through the closure 60; the side, front, rear and bottom walls when assembled together comprising the unit or shell 46.

The space within the shell may be divided by a horizontally arranged partition 65 extending backwardly from the front wall 58 at the top of the access opening. The shell 46 comprises the high temperature of air cooling section of the evaporator and the exterior of the shell 46 is exposed to the air within the heat insulated compartment 30 so as to cool such air, the heat removed from the air being absorbed by the refrigerant within the ducts of the shell so as to evaporate such refrigerant. The shell 46 also is arranged to house the low temperature or freezing section 50 of the evaporator.

The low temperature or freezing section of the evaporator is illustrated in Figs. 8, 9, 10 and 11, apart from the air cooling section of the evaporator.

The low temperature section of the evaporator comprises a series of vertically spaced shelves or plates 66 which are adapted to be disposed one above the other within the shell 46 and as illustrated in Figs. 2, 8 and 9 of the drawings. In addition to the refrigerated plates or shelves the low temperature section of the evaporator includes a liquid refrigerant header 68 into which liquid refrigerant from the receiver is admitted by a suitable regulating device, such as a float control valve arranged within the header 68, a suction header 70 to which the suction line 32 returning to the compressor is connected and tubing or conduits operatively connecting the header 68 and the refrigerated plates or shelves 66.

Each plate or shelf 66 comprises a flat metallic member adapted to be horizontally arranged and to the underside of each plate there is suitably secured, such as by brazing or welding, a loop 72 of tubing comprising two like sections 74, the ends of which sections of tubing are connected to coupling members 76. The coupling members 76 disposed at the front of each of the plates has connected to it a liquid refrigerant supply conduit 78 leading from the liquid header 68, the conduit 78 including a trap or bend portion 79 from which the conduit slopes in an upward direction so as to cause the circulation of refrigerant from the header 68 downwardly through the vertical portion of the conduit 78, the trap 79 and to the coupling members 76 arranged at the forward end of the shelf 66. A return pipe or conduit 80 is connected to the coupling member 76 arranged at the rear or back of the shelf 66 so as to conduct refrigerant back to the header 68. Each of the plates or shelves 66 are constructed alike except that the lower plates or shelves have longer supply and return tubes than the upper plates or shelves and it will be observed that the liquid conduit or tubing 78, 72 and 80 are so arranged as to cause a circulation of refrigerant from the header 68 downwardly through the tubes 78 to the front of the plates, the loop 72 and upwardly through the tubing 80, thus aiding in keeping the tubing full of liquid refrigerant and conducting the vaporized refrigerant and refrigerant bubbles up into the header 68.

The suction header 70 is connected to the liquid header 68 by two conduits 82 and 84. The tube or conduit 82 is horizontally arranged and adapted to connect the headers 68 and the tube or conduit 84 is provided for equalizing the pressures within the headers 68 and 70 and to permit the escape of gas into the header 70 in such a way as to not carry an oil froth or oil bubbles therewith. The suction line for the low temperature section of the refrigerator is connected to the header 70. As the low temperature section of the evaporator is designed to produce refrigeration at the lowest temperature, the evaporator is connected by the suction line 32 to the compressor 20 so as to obtain the lower suction pressure within the headers 68 and 70. One end of the conduit 32 terminates in a coupling member 86 clamped between a fitting 88 carried by the suction header 70 and a threaded member 90 suitably secured to the fitting 88. The threaded member 90 is hollow and carries a vertical tube 92, the member 90 being provided with radially extending openings 94 for communicating with the hollow interior of the coupling member 86 and with the vertical tube 92. The tube 92 extends vertically within the suction header 70 to above the liquid level therein. A plurality of capillary wicks 94a extend from below the liquid level in the suction header 70 up over the top end of the tube and downwardly into the tube to a level substantially lower than that of the opposite end of such wicks, the wicks being provided for inducing a flow of lubricant by capillary attraction into the bottom of the threaded member 90 where such lubricant is picked up and carried by the vaporized refrigerant returning to the compressor through the suction conduit 32.

Because the maximum liquid level in the header 68 falls at the level of the tube 82 a body of liquid will be formed within the suction header 70 and the end of the capillary wicks therefor will extend below the surface of the liquid level. It is contemplated to use as a refrigerant sulphur dioxide and that a certain amount of lubricant will be circulated through the system with the refrigerant. The lubricant used in connection with the sulphur dioxide is not miscible with the liquid refrigerant so that the lubricant will float upon the surface of the liquid refrigerant and hence may be collected therefrom by the capillary wicks 94a. It is necessary to collect the lubricant from the surface of the liquid within the headers 68 and 70 in order to prevent the accumulation of all of the lubricant within the evaporator headers which as known would prevent or impair the vaporization of the liquid refrigerant.

In addition to the shell 46 the air cooling section of the evaporator includes a liquid header 96 arranged in the space between the side walls 52 and at the upper end thereof, and a control 42 suitably affixed to the front wall 58 and having a thermostatic bulb or element 98 clamped to the outside of the header 96.

Each of the side walls 52 of the shell 46 comprises a pair of plates 100 and 102 provided with a series of vertically arranged grooves, which grooves when the plates 100 and 102 are assembled together, are adapted to provide vertical refrigerant ducts 104 and 106. The plates 100 and 102 are also formed to provide transverse grooves which when the plates are assembled together form a lower refrigerant header 108 and an upper refrigerant header 110 between which communication is provided by the vertical ducts 104 and 106. The plates are stamped individually to define the various grooves, then assembled together and welded or brazed so as to form a unitary wall. To the outside of each of the walls 52 there are secured, such as by welding or brazing, a series of vertically extending fins 112, and which fins 112 project out into the path of the air circulating within the heat insulated compartment so as to expedite the transfer of heat between the air and refrigerant contained within the ducts 104 and 106. The fins 112 increase the surface of the air cooling portion of the evaporator. The upper transverse headers 110 are each connected to the liquid header 96 by a horizontally arranged duct 114 of relatively large cross-section, it being intended that the maximum liquid level within the header 96 shall fall within the vertical limits of the ducts 114 so that liquid refrigerant will be supplied to the upper headers 110 and through the same to the vertically extending ducts 104 and 106. It will be observed that the vertical ducts 106 are of a larger cross-sectional area than the ducts 104 and that each duct 106 of larger cross-section is arranged with three (3) small ducts 104 on each side thereof. This arrangement of the ducts 104 and 106 is designed to produce a flow of refrigerant downwardly through the ducts 106 and upwardly through the ducts 104.

Figure 13:
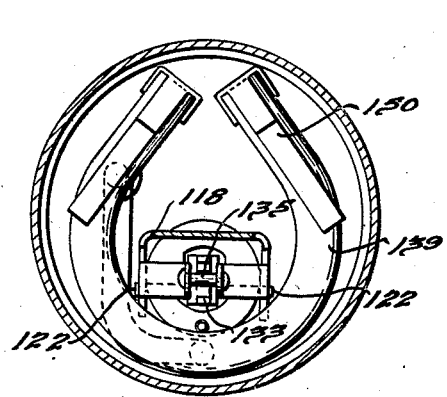
Fig. 13 is a vertical cross-sectional view taken along the line 13—13 of Fig. 12 and illustrating other details of the float valve and oil return of the high temperature section of the evaporator.
Figure 11:
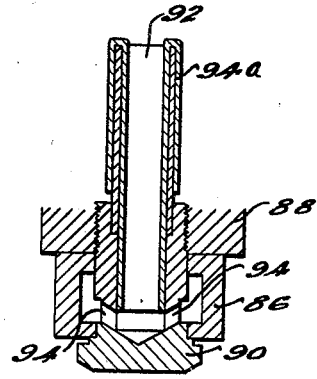
Fig. 11 is a vertical sectional view through the oil and refrigerant vapor return from the low temperature section of the evaporator and taken in a plane on the line 11—11 of Fig. 9 looking in the direction of the arrows.
Figure 14:
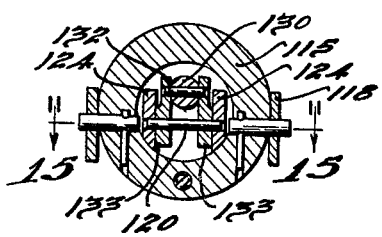
Fig. 14 is a vertical cross-sectional view taken along the line 14—14 of Fig. 12 and illustrating a section through the pivotal means for the needle valve which controls the flow of refrigerant.
Figure 15:
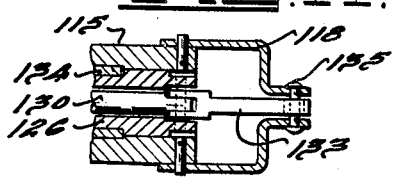
Fig. 15 is a horizontal section of the details illustrated in Fig. 14 and taken along the line 15—15 of Fig. 14.

In Figs. 12 and 13 the details of the header 96 are illustrated. The header 96 comprises a metallic drum open at one end and to which open end an end wall 115 is permanently secured. Within the header 96 a float 116 is connected to a bracket 118 pivotally secured by pins 122 to the inside of the wall 115. The float 116 is adapted to float on the liquid within the header 96 and to operate a valve for controlling the admission of liquid refrigerant to the header 96. The wall 115 is provided with a relatively large bore in which a valve body 126 is disposed. The valve body 126 has a passageway extending therethrough in which is disposed a valve seat 128 adapted to cooperate with a needle valve 130 for controlling the flow of refrigerant through the passageway in which the valve seat 128 and needle valve 130 are disposed.

The needle valve 130 is pivotally connected by a pin 132 with bifurcated end of a lever 133. One end of the lever 133 is pivotally secured by a pin 120 to a pair of lugs 124 provided on the valve body 126 and the other end of the lever 133 is provided with a slot which is detachably engageable with a cross bar 135 carried by the bracket 118.

Thus upon vertical movement of the float 116 the needle valve 130 is adapted to be seated and unseated with respect to the valve seat 128. The valve body 126 is carried by a hollow plug 134 which is adapted to be threadedly secured within a threaded portion of the bore to the wall 115. A coupling member 136, connected to a branch of the liquid line 40, is adapted to be clamped about the plug 134 and between a projecting boss on the wall 115 and a threaded cap 138 which is threadedly engageable with an end of the plug 134. The coupling member 136 and plug 134 afford communication between the liquid line 40 and the passageway controlled by the needle valve 130, and refrigerant is thus supplied to the header 96 under the control of the float 116.

A U-shaped tube 139 is arranged within the header 96 and has connected to the central part thereof a piece of tubing 140, one end of which is press fitted within a bore formed in the wall 115 and communicating with a passageway 142 to which the suction line 34 is connected by means of a coupling member 144 secured in place by a threaded member 146. The open ends of the U-shaped tube 139 are arranged adjacent the top of the header 96 and are each provided with a series of capillary wicks 150 which outside of the tube 139 extend down a considerable way below the level of the outside end of the wicks 150 so as to induce a flow of lubricant by capillary action into the tube 139 where such lubricant is picked up by the refrigerant vapor returning to the compressor through the tubes 139 and 140, and conduit 34.

The float controlled valve for the header 68 of the low temperature section of the evaporator may be identical in construction to the float control valve disclosed in connection with the header 96.

The liquid refrigerant supply conduit 40 is divided into two branches one of which (41) leads to the coupling member 136 for the header of the air cooling section of the evaporator and the other of which (43) leads to a coupling member 137 connected to the float controlled passageway of the header 68 of the low temperature section of the evaporator.

The shield 62 comprises a stamping having a front face adapted to be disposed forwardly of the evaporator shell 46 and is provided with an opening coinciding with the front opening in the shell 46. A resilient gasket 160 of flexible material, such as rubber, is carried by the forward edge of the evaporator shell and around the edge of the door opening and which gasket 160 projects forwardly slightly beyond the front face of the shield 62 and through the opening therein so as to engage the inner surface of the door 60 for the purpose of substantially sealing the space within the shell 46 against the circulation of air into and out of same, except when the door or closure 60 is open. The closure 60 may be carried by hinges 164, which are secured to one side of the shield 62. The shield, along the bottom and at the sides thereof, is provided with a rearwardly extending flange 166 by means of which the shield 62 may be secured to side brackets 168 and a bottom bracket 169 carried by the shell 46 on the exterior thereof adjacent the front, and the flange 166 may be connected to the brackets in any suitable manner such as by screws to permit the shield to be removed from the shell 46. Shield 62 is provided with a pair of apertures which permit the control knobs 170 and 172 to extend forwardly from the face of the shield so as to be accessible. The side brackets 168 on the shell 46 and a bracket 174 provide a means by which the entire evaporator assembly may be hung within the heat insulated compartment 30.

The low temperature section 50 of the evaporator is adapted to be housed within the shell 46, the headers 68 and 70 being connected by a bracket 176 which is adapted to be bolted to a pair of side brackets 178 secured to the inside of the shell 46 adjacent the top thereof, and the refrigerated shelves or plates 66 are each adapted to be supported by a pair of rods 180 extending through oppositely arranged apertures in the side walls 52, covered with insulating material 182, such as rubber, and having spacers 184 for spacing the edges of the shelf 66 from the side walls 52. The vertically disposed tubes 78 and 80 of the low temperature section 50 of the evaporator pass upwardly past the partition 65 at the rear thereof.

The liquid refrigerant is fed independently to each section of the evaporator under the control of the float operated valves disposed in the headers 68 and 96. The suction lines 32 and 34 from each section of the evaporator are connected to different sections of the compressor 20 so as to obtain a different suction pressure in one section of the evaporator than in the other. For instance, the suction line 32 from the low temperature section 50 of the evaporator may be connected to the compressor so as to supply refrigerant vapor thereto at the beginning of the intake or suction stroke of the compressor and the suction line 34 may be connected to the compressor in such a way that refrigerant vapor is not supplied to the compressor until the piston element therein has partially completed the suction or intake stroke. In order to create different temperature conditions in the different sections of the evaporator it is necessary to have the different sections of the evaporator under different pressures so that vaporization of the refrigerant will take place at different temperatures. This is accomplished in the present instance by the two suction lines connected at different sections of the same compressor, although it will be appreciated that a single suction line might be employed provided there was a restriction or regulating device between said single suction line and one of the sections of the evaporator so as to maintain a difference in pressure between the different sections of the evaporator.

The control 42 includes a manually operated switch which is adapted for opening and closing the motor circuit and a switch which is thermostatically operated, the thermostatic element 98 of said switch being associated with the liquid header 96 of the air cooling section of the evaporator; the thermostatic control switch operating to break and close the motor circuit so as to maintain the temperature within the heat insulated compartment 30 and the evaporator within certain predetermined limits.

The refrigerator plates or shelves 66 are adapted for supporting trays for freezing water or other materials at a fast rate, the temperature obtained within the shell remaining in the neighborhood of 10° to 15° F., whereas temperatures may be obtained within the heat insulated compartment from in the neighborhood of 30° to 45° F. and the temperature of the outside surface of the shell 46 and the fins 112 may be in the neighborhood of 26° to 29° F. The shell 46 houses the low temperature section of the evaporator and forms a shield therefor so as to shield the same from the air circulating within the heat insulated compartment 30. While the low temperature section 50 of the evaporator is shielded by the shell 46, there will be some transfer of heat through the walls of the shell 46 onto the refrigerated plates particularly if there is no heat load upon the low temperature section of the evaporator.

It is to be understood that the invention is not limited to the specific features of the structure disclosed, but is to be considered broadly as is represented by the scope of the appended claims.

What I claim is:

1. Evaporator construction comprising a pair of vertically arranged spaced sheet metal side walls, each of said side walls comprising a pair of plates secured together and arranged to provide upper and lower horizontally extending headers and refrigerant ducts interconnecting said headers, means for enclosing the space between said side walls, and including a door for providing access to said space, and means arranged between said side walls and adapted for supplying liquid refrigerant to and conducting vaporous refrigerant from said upper headers.

2. Evaporator construction comprising a pair of spaced sheet metal side walls, each of said side walls comprising a pair of plates secured together and arranged to provide upper and lower horizontally extending headers, and refrigerant ducts for interconnecting said headers, said refrigerant ducts including ducts of different cross-sectional area.

3. Evaporator construction comprising a U-shaped member defining side walls and a bottom wall of an enclosed space, said U-shaped member being formed to provide horizontally extending upper headers and horizontally arranged lower header means and including refrigerant ducts interconnecting said upper headers with said lower header means, said refrigerant ducts including ducts of different cross-sectional area, and a liquid header for supplying liquid refrigerant to and conducting vaporous refrigerant from said upper headers.

4. Evaporator construction comprising a U-shaped member defining side walls and a bottom wall of an enclosed space, said U-shaped member being formed to provide horizontally extending upper headers and horizontally arranged lower header means and including refrigerant ducts interconnecting said upper headers with said lower header means, said refrigerant ducts including ducts of different cross-sectional area, a liquid header arranged between said upper headers and adapted for supplying liquid refrigerant to and conducting vaporous refrigerant from said upper headers, and fins carried by the side walls of said evaporator and intimately thermally associated with those of the refrigerant ducts having the smaller cross-sectional area.

5. Evaporator construction comprising a horizontally arranged shelf, provided with refrigerant ducts intimately thermally associated therewith, a liquid header, a conduit including a trap and an upwardly sloping portion for supplying liquid refrigerant from said header to one end of said shelf and a second conduit interconnecting the other end of said shelf and said header.

6. Evaporator construction comprising a shell, a plurality of vertically arranged shelves within said shell, each of said shelves being provided with refrigerant ducts intimately thermally associated therewith, a liquid header arranged above said shelves, means for independently supplying refrigerant from said header to one end of each of said shelves, and means for independently conducting refrigerant from the other end of each of said shelves to said header.

7. Evaporator construction comprising a pair of headers, a liquid refrigerant supply line connected to one of said headers, a vaporous refrigerant suction line connected to the other of said headers, a connection between said headers and disposed at the maximum liquid level therein, a second connection between said headers and arranged above the maximum liquid level in both of said headers, and refrigerant ducts communicating with that one of said headers to which the liquid refrigerant line is connected and below the maximum liquid level therein.

8. A two-temperature evaporator comprising a shell exposed to the circulating air in a heat insulated compartment and having its side walls defined in part at least by refrigerant ducts, a plurality of refrigerated shelves arranged within said shell and shielded from the circulating air in said compartment by said shell, means including a pair of low-side floats arranged in parallel and within said shell for independently supplying liquid refrigerant to said shelves and to said shell, and means for exposing the refrigerant in said refrigerated shelves to a different suction pressure than that to which the refrigerant in said shell is exposed.

JOHN C. BUCHANAN.